United States Patent [19]

Groff et al.

[11] 4,100,019

[45] Jul. 11, 1978

[54] NOZZLE SEAL

[75] Inventors: Russell Dennis Groff, Canal Fulton; Richard John Vatovec, Akron, both of Ohio

[73] Assignee: The United States of America as represented by the United States Department of Energy, Washington, D.C.

[21] Appl. No.: 591,255

[22] Filed: Jun. 27, 1975

[51] Int. Cl.² .............................................. G21C 15/00
[52] U.S. Cl. ....................................... 176/50; 176/87; 137/590
[58] Field of Search ............... 176/50, 60, 87; 277/74, 277/98, 99, 104, 149; 84/26; 137/590

[56] References Cited

U.S. PATENT DOCUMENTS

| | | | |
|---|---|---|---|
| 1,111,039 | 9/1914 | Smith | 89/26 |
| 2,854,927 | 10/1958 | Berg | 277/74 |
| 3,554,868 | 1/1971 | Thorp | 176/87 |
| 3,628,799 | 12/1971 | Wiese | 277/74 |
| 3,804,424 | 4/1974 | Gardner | 277/74 |
| 3,850,796 | 11/1974 | Thome | 176/87 |

*Primary Examiner*—Stephen C. Bentley
*Assistant Examiner*—S. A. Cangialosi
*Attorney, Agent, or Firm*—Dean E. Carlson; J. M. Maguire; R. G. Erdley

[57] ABSTRACT

In an illustrative embodiment of the invention, a nuclear reactor pressure vessel, having an internal hoop from which the heated coolant emerges from the reactor core and passes through to the reactor outlet nozzles, is provided with annular sealing members operatively disposed between the outlet nozzle and the hoop and partly within a retaining annulus formed in the hoop. The sealing members are biased against the pressure vessel and the hoop and one of the sealing members is provided with a piston type pressure ring sealing member which effectively closes the path between the inlet and outlet coolants in the region about the outlet nozzle establishing a leak-proof condition. Furthermore, the flexible responsiveness of the seal assures that the seal will not structurally couple the hoop to the pressure vessel.

4 Claims, 5 Drawing Figures

NOZZLE SEAL

BACKGROUND OF THE INVENTION

1. Field of the Invention

The present invention is directed to pressure vessels and more particularly to a nuclear reactor pressure vessel nozzle seal.

2. Description of the Prior Art

The conventional nuclear reactor pressure vessel comprises a longitudinally disposed cylindrical structure, closed at both ends by a convex base and a domed roof, having reactor coolant inlet and outlet nozzles protruding therethrough. Generally, these nozzles are disposed in a plane transverse to the longitudinal axis of the vessel and angularly separated from each other. Housed within the pressure vessel structure are, among others, the nuclear core, subassemblies and a fluid coolant. Moreover, within the pressure vessel, an annular flange is formed on the inner surface thereof. The flange serves as a means for supporting the reactor core which is suspended from a distribution hoop or shell.

The distribution hoop is extended by means of a thermal shield-skirt assembly, which supports the fuel elements in the reactor core and which also serves as a hydraulic guide.

In operation, the fluid coolant, in forced circulation, enters the pressure vessel through the inlet nozzles, and flows through the annular hydraulic guide that is formed between the inner surface of the pressure vessel and the skirt. The coolant then rises through the core of the reactor whereupon it is discharged from the vessel through an outlet nozzle which is in fluid communication with the hoop opening through conduit means interposed therebetween.

To insure proper circulation, it is imperative that direct communication be prevented between the incoming coolant and the discharging coolant. Toward this end, a leak-proof contact between the hoop opening and the pressure vessel outlet nozzle is required. However, although a leak-proof contact is necessary to prevent direct fluid communication, structural and differential thermal expansion conditions which can occur between the internal reactor structures and the pressure vessel must be considered. In general, the attendant thermal expansion precludes fixedly joining the conduit means to both the hoop and the pressure vessel wall. Therefore, a leak-proof sealing means, either as part of the conduit or in substitution thereof, is required to prevent the commingling of the inlet fluid coolant and the outlet fluid coolant. Further, from a structural consideration it is desirable that the sealing means segregate the fluid coolants without structurally coupling the hoop to the pressure vessel.

In the past, a leak-proof seal was established by a spring biased contact of a sealing ring or by thermal expansion contact of the conduit. In general, the thermal expansion contact seal consists of carefully and tediously machining the conduit or a ring to be attached thereto to establish a designed clearance or tolerance between the machined conduit or ring face and the pressure vessel nozzle during assembly. The leak-proof condition, however, for this thermal expansion type seal is only achieved at the elevated operating temperatures of the nuclear reactor system when thermal expansion of the hoop and conduit expand to meet the inner wall of the pressure vessel. Moreover, since the pressure vessel also expands during operation, this thermal expansion conduit-seal generally requires a material having a greater thermal expansion coefficient for the hoop and/or the conduit than the expansion coefficient of the pressure vessel, if the leak-proof state is to be achieved.

The spring contact type seal, moreover, comprises a cylindrically shaped sealing member disposed within and extending from a cylindrical annular cavity concentric therewith. The sealing member is generally machined on one face of its cylindrical shape in order to nestle in close contact with, for example, the pressure vessel wall about the outlet nozzle and thereby prevent leakage therebetween. A spring disposed within the annular cavity interposed between the other face of the cylindrical sealing member and the rear wall of the cavity, or a compression ring, exerts in the axial direction the force necessary to tightly seat the sealing member against the pressure vessel wall. Moreover to prevent leakage flow from one fluid from traveling through the annulus, between the sealing member and the annular cavity, and across the spring into communication with the other fluid, both the sealing member and the cavity are machined to exact close fitting tolerances such that the sealing member is tightly seated in the cavity. However, the seating or mating of the seal ring to the cavity, even with the strict matching of machining tolerances of the slideably engaging members, produces a narrow gap therebetween. Moreover, although this narrow gap provides a labyrinth-like flow passage, the high differential pressures encountered within a pressure vessel enhance fluid leakage flow therethrough and establish fluid communication between the inlet and outlet coolants. Therefore, flow leakage or fluid communication between the coolants is not prevented but merely reduced by this type of seal. Moreover, from a cost efficient viewpoint, this leakage rate is too large and the machining tolerances are too stringent for economic justification of this type seal.

Accordingly, there is a need to provide a sealing means which will prevent or at least reduce the leakage flow between the incoming and discharging coolants at all operating conditions without the stringent manufacturing tolerances, or the use of different materials having different thermal coefficients that are characterized by the prior art systems.

SUMMARY OF THE INVENTION

In accordance with the invention, a reactor pressure vessel-hoop discharge sealing means is provided which eliminates costly machining, removes the thermal expansion determination of the sealing means-pressure vessel clearance, allows a wider selection of materials for the hoop and/or sealing means and establishes a satisfactory leak-proof seal in all reactor conditions, operating or during shut down, without structurally coupling the distribution hoop to the pressure vessel.

Specifically, a reactor pressure vessel-hoop discharge nozzle sealing means that has these features comprises an annular sealing ring biased against the hoop opening or the pressure vessel in sealing engagement therewith by an elastically responsive member, and a piston type pressure ring sealing member circumferentially interposed in sealing engagement with an annular portion of the leakage flow path that would otherwise establish communication between the inlet and outlet coolants through the nozzle sealing means.

More specifically, the coolant discharge nozzle seal comprises; an annular retaining ring disposed about the hoop discharge opening, having a recess formed therein; an annular compression ring member seated within the recess of the retaining ring; a sealing ring slideably engaged therewith having a contact face surface for engagement with the pressure vessel about the outlet nozzle; a plurality of springs interposed between the sealing ring and the compression ring to effect the sealing engagement thereof with the hoop and/or the pressure vessel; and a piston type pressure ring sealing member circumferentially disposed in an annular spacing, formed between mating members of the nozzle sealing means, in sealing engagement therewith, effectively closing the leakage flow path therethrough. In addition, the nozzle sealing means is responsive to expansion and contraction of the nozzle seal without structurally coupling the hoop to the pressure vessel. Moreover, since the piston type pressure ring sealing member prevents flow leakage through the discharge sealing means, the machining of close tolerance slideably engaging members of the seal is not required. Therefore, from a cost efficient view, the excessive manufacturing costs of close tolerance engaging members as found in the prior art thermal expansion and spring type seals are eliminated. That is, the seal effectively prevents leakage independent of the size of the annular flow path formed by the mating members.

The various features of novelty which characterizes the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawings.

Figure 1:
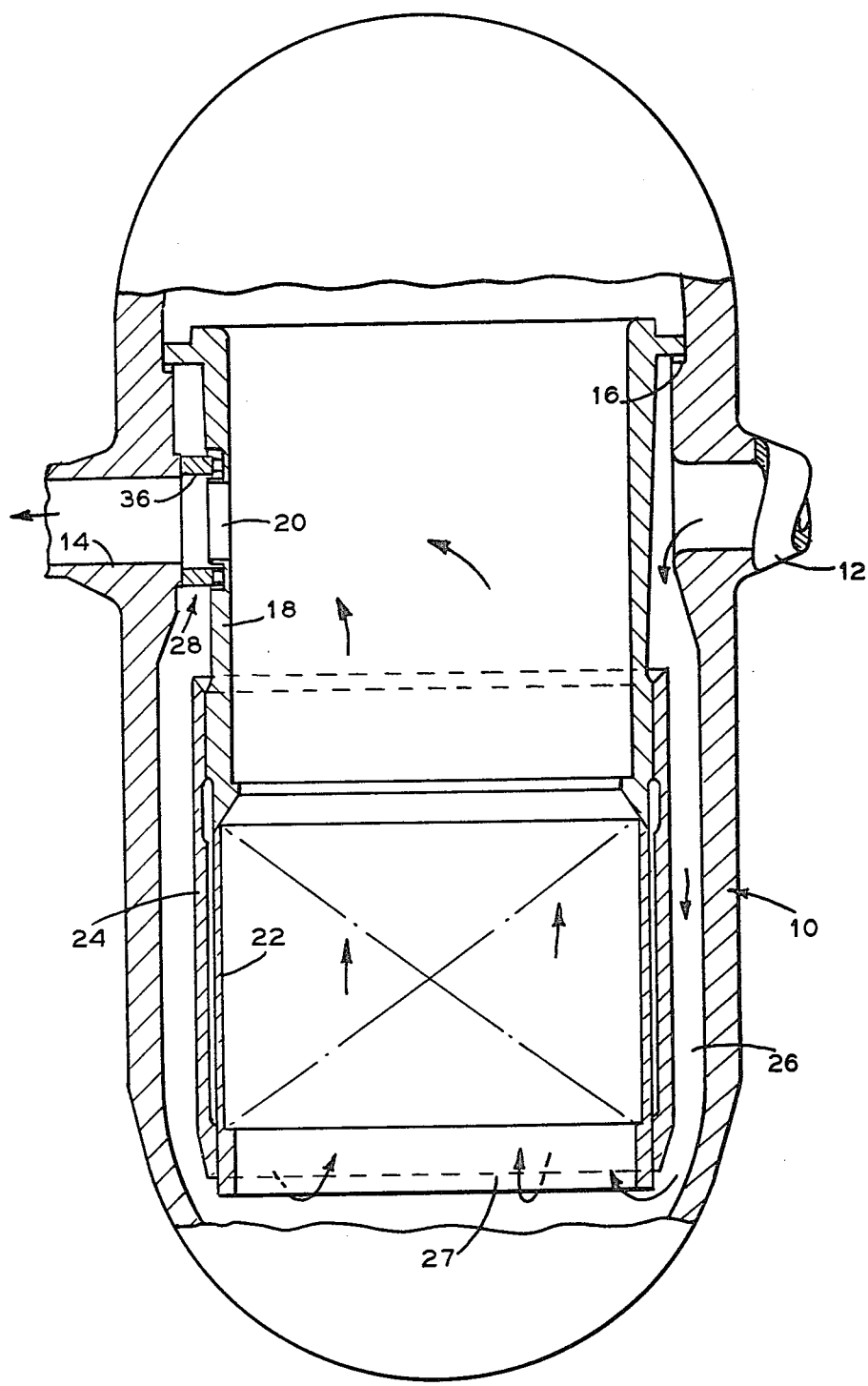
FIG. 1 shows an illustrative nuclear reactor pressure vessel in full section embodying principles of the invention.

In FIG. 1 there is illustrated a nuclear reactor pressure vessel 10 which has a longitudinally disposed cylindrical envelope closed at each end by a convex base and a domed roof. Reactor coolant inlet and outlet nozzles 12 and 14 respectively, protrude from the pressure vessel 10 near the domed roof. These nozzles are generally all disposed in the same plane, that is, transverse to the longitudinal axis of the cylindrical vessel and are separated from each other with an angular displacement. An annular flange 16 formed on the inner surface of the vessel 10 serves as a means for supporting a distribution hoop 18. The hoop 18 has an opening 20, for reactor coolant discharge, which is aligned with the outlet nozzle 14 in the vessel 10.

The distribution hoop 18 is extended by means of a skirt 22 and a thermal shield 24 which serve as a hydraulic guide for the incoming fluid coolant entering the annulus 26 formed between the hoop-skirt assembly and the pressure vessel wall from the inlet nozzle 12. Furthermore, the skirt 22 supports the fuel elements in the reactor core (not shown).

In operation, the coolant enters the pressure vessel 10 through the inlet nozzle 12 and flows downwardly through the annulus 26, rises through a transverse opening 27 in the hoop-skirt assembly to flow through the reactor core (not shown), and from the core to the distribution hoop 18, whereupon the heated coolant is discharged from the vessel 10 through the opening 20 and the outlet nozzle 14.

Figure 2:
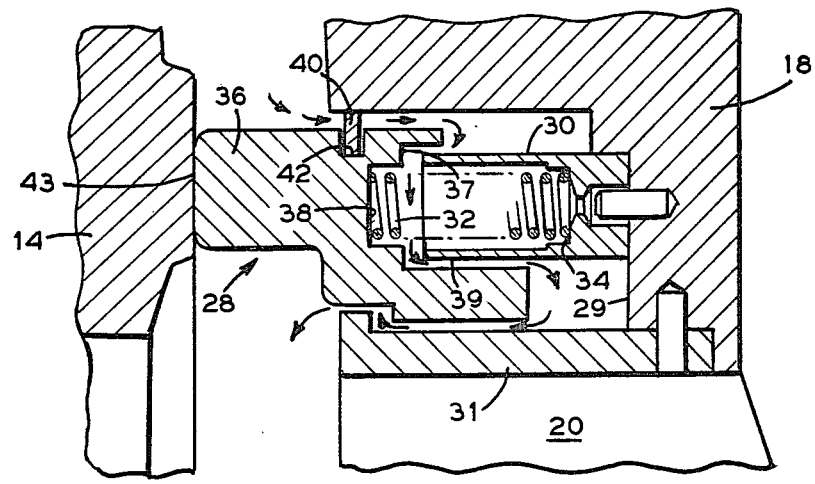
FIG. 2 is an enlarged view of a portion of a nuclear reactor pressure vessel discharge nozzle embodying principles of the invention.

As shown in FIG. 2 the outlet nozzle 14 for the vessel 10 is in alignment with the opening 20 in the distribution hoop 18. An outlet nozzle seal 28 in accordance with this invention joins the hoop 18 to the vessel 10 or, more specifically, joins the hoop discharge opening 20 to the reactor pressure vessel outlet nozzle 14. As shown in this particular embodiment of the invention, the seal 28 is disposed within a recess 29 in the hoop 18 and circumferentially disposed about a retaining ring 31 in the hoop opening 20. Disposed within the recess 29 and extending outwardly therefrom is an annular ring shaped member or compression ring 30. Although shown here as a separate ring member, it is understood that the compression ring 30 may be readily fashioned in and from the hoop 18. Projecting outwardly from the compression ring 30 and generally axially therewith is a spring 32 which is disposed at one end in a recess 34 in the compression ring. An annular seal ring 36, also in general axial alignment therewith, extends outwardly from the compression ring 30, and is biased therefrom by the spring 32 which is partially disposed in a recess 38 in the seal ring 36. In addition, an annular portion 37 of the seal ring 36 extends within the recess 29 of the hoop 18, and slideably engages in space surrounding relation a portion 39 of the compression ring 30. However, the sliding engagement of the seal ring with; the hoop, the compression ring, and the retaining ring and the spaces between the loops of the spring would form a labyrinth-like flow path (indicated by arrows in FIG. 2), as found in the prior art, for leakage flow communication between the inlet and outlet coolants but for the invention herein described.

A nozzle seal in accordance with this invention, as shown in FIG. 2, includes a piston type pressure ring sealing member 40 disposed in a groove 42 about the seal ring 36 and extends outwardly therefrom in circumferential sliding sealing engagement with the recess 29. The sealing member 40 is a split ring, piston ring or packing ring commonly associated with the pistons of an internal combustion engine and acts in a similar fashion. That is, the piston type pressure ring 40 typically has a larger diameter, as measured to its exterior surface, than the interior diameter of the walls of the hoop 18 forming the recess 29 within which is disposed the seal ring. Further, the inner diameter of the pressure ring, seated within the groove 42 in the seal ring, is smaller than the seal ring diameter for all conditions, therefore retaining the position of the pressure ring with respect to the seal ring, that is, within the groove. Assembly of the piston type pressure ring is also similar to that of an internal combustion piston ring. The pressure ring 40 is inserted within the groove 42 about the seal ring outside of the hoop recess 29. Thereupon the pressure ring is squeezed together reducing the diameter of the pressure ring, and the pressure ring seal ring member is inserted within the hoop recess 29. Once this member is inserted within the recess, the "squeeze" force or radially inward force is released and the pressure ring expands into sealing engagement with the walls of the recess. In this fashion, the annulus formed between the piston and the recess wall is effectively closed and the radially directed forces enable the split ring to withstand a differential pressure across the ring without preventing the sliding engagement of the seal ring.

Accordingly, the piston type pressure ring sealing member 40 disposed in the groove 42 sealably engages the recess 29 effectively closing the flow path formed by the mating members of the nozzle seal. Moreover, the pressure ring sealing member 40 is capable of withstanding a large pressure drop, i.e. a differential pressure between the inlet and outlet coolants, to prevent leakage through the nozzle seal. In this way, the pressure ring sealing member 40 sealably closes the leakage flow path through the sliding engagement of the outlet nozzle seal 28. Moreover, inlet and outlet fluid coolant communication is thereby prevented by a leak-proof seal in accordance with this invention, regardless of the size of the annular flow path formed by the sliding engagement of the mating members of the nozzle seal. That is, the effectiveness of the discharge nozzle seal is no longer dependent on the close tolerance matching of slideably engaging members.

The nozzle seal 28, or more specifically, the spring 32 is designed such that, in its assembled relationship with respect to the hoop opening 20 and the vessel nozzle 14, it forces the broad surface 43 of the seal ring 36 into sealing engagement with the reactor pressure vessel, about the nozzle 14, independent of reactor operation or thermal expansion. In addition, to aid in the leak prevention between the seal ring and the vessel and to resist wear, the pressure vessel about the outlet nozzle may be cladded with a wear surface, not shown.

Figure 3:
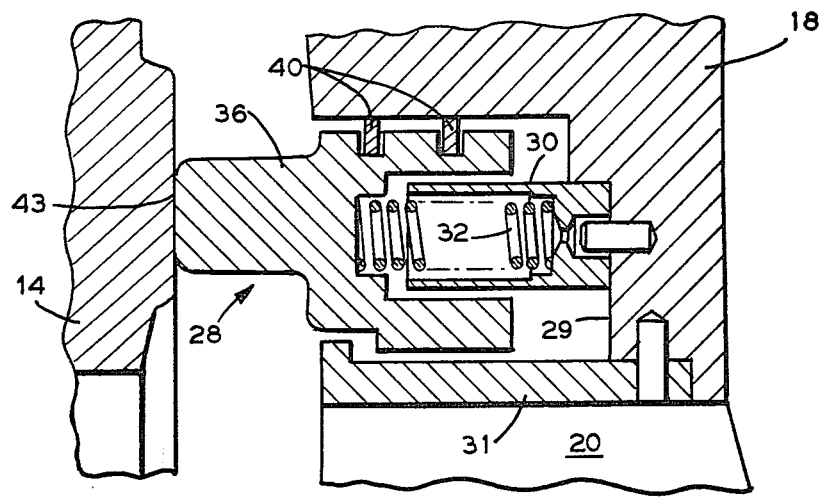
FIGS. 3, 4, and 5 are further embodiments of the invention.
Figure 4:
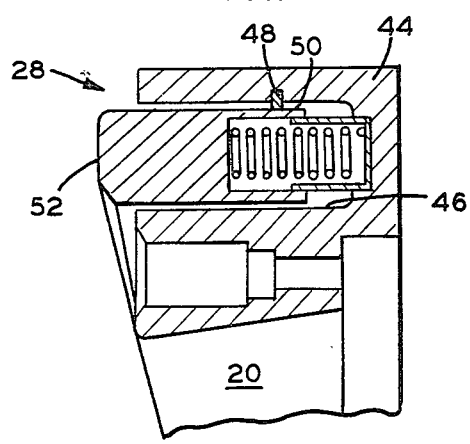
Figure 5:
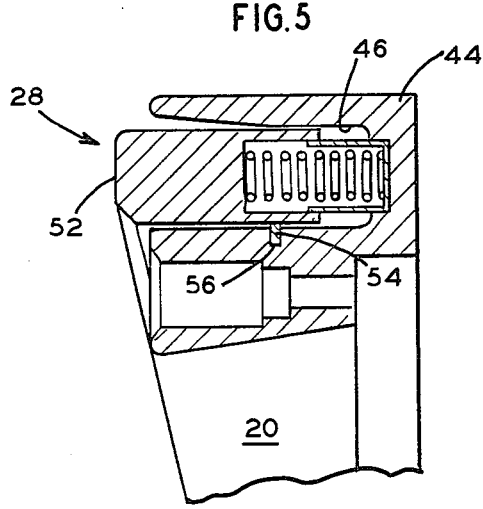

Further embodiments of the invention are shown in FIGS. 3 through 5 inclusive. In FIGS. 3, for example, a plurality of pressure ring sealing members 40 are disposed circumferentially about the seal ring 36 in sliding sealing engagement with the hoop recess wall 29, as explained above, to prevent leakage through the nozzle seal and to reduce the differential pressure across each pressure ring.

Further embodiments of the invention are shown in FIGS. 4 and 5. As shown in FIG. 4, the annular nozzle seal 28 is disposed within a recess 46 formed in an annular retaining ring 44 which in turn is tightly seated about the hoop opening 20 and in a recess (not shown) formed within the hoop to receive the ring 44. Further, in this embodiment of the invention the piston type pressure ring sealing member 48 is circumferentially disposed in a groove 50 in the outer wall of the recess 46, as measured radially from the axis of the retaining ring 44, and extends inwardly across the annulus between the retaining ring and the annular seal ring 52 to sealably engage therewith, and effectively prevent leakage flow through the nozzle seal as explained above. It is to be noted that in this embodiment of the invention the pressure ring sealably closes the flow path by "expanding" radially inward from the retaining ring to sealably engage the seal ring.

As shown in FIG. 5, the annular nozzle seal 28 is disposed within a recess 46 formed in a retaining ring 44, as described in FIG. 4. Further, in this embodiment of the invention the piston type pressure ring sealing member 54 is circumferentially disposed in a groove 56 in the inner wall of the recess 46, as measured radially from the axis of the retaining ring, and extends across the annulus between the retaining ring and the annular seal ring 52 to sealably engage therewith, as explained above.

Moreover, in the practice of this invention it may in fact be advantageous to size the groove with a thermal expansion clearance, that is, to slightly oversize the groove, to accommodate an increased differential thermal expansion of the piston type pressure ring sealing member, and thereby avoid excessive radial forces due to the increased diameter of the ring. In this manner, the ring sealing member would continue to prevent leakage flow through the nozzle sealing means without structurally coupling the hoop to the reactor pressure vessel.

In accordance with this invention, flow communication between the incoming and outgoing coolants in the vicinity of the outlet nozzle 14 is prevented by a piston type pressure ring seal operatively disposed in sealing engagement in an annulus formed by the nozzle seal, and, in addition, this fluid seal is independent of the flow path formed between the sliding engagement of the seal ring with the compression ring, hoop recess and/or retaining member, thereby eliminating the need of costly machining thereof. Furthermore, the flexible responsiveness of the seal assures that the seal will not structurally couple the hoop to the pressure vessel.

What is claimed is:

1. A reactor system comprising a pressure vessel having at least one inlet and one outlet nozzle, a distribution hoop located within the vessel, the hoop having an opening facing the outlet nozzle, an impervious means interposed between the vessel and the hoop to define a fluid flow channel extending from the opening to the outlet nozzle, said impervious means including a compression ring circumscribing the opening, the compression ring being formed with an annular recess, a spring seated in the recess, a seal ring slidably mounted on the compression ring, the spring urging the seal ring toward the vessel to maintain sealing contact therebetween, and means including at least one slidable pressure ring for precluding fluid leakage between the seal ring and said hoop.

2. The reactor system according to claim 1 wherein the seal ring is formed with an annular groove for supporting said pressure ring.

3. The reactory system according to claim 1 wherein the last named means includes a retaining member connected to the hoop and slidably engaged with said seal ring.

4. The reactor system according to claim 3 wherein the retaining member is formed with an annular groove for supporting said pressure ring.

* * * * *